Aug. 25, 1964   R. C. SCHNEIDER   3,145,535
HYDRAULIC COUPLING
Filed April 11, 1961   3 Sheets-Sheet 1
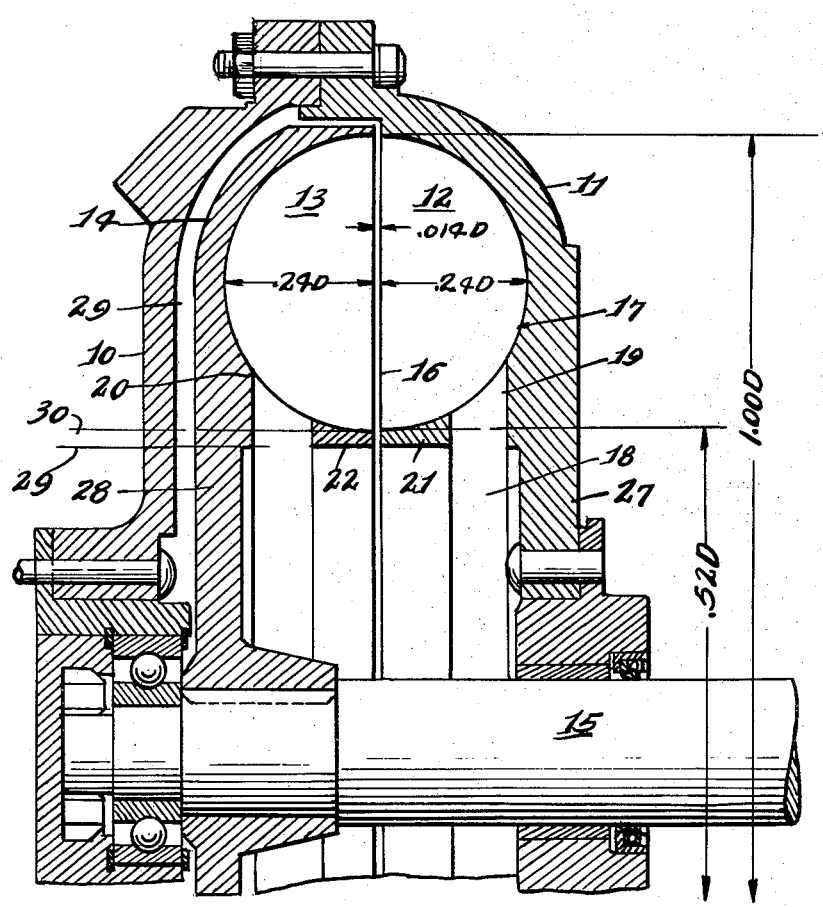
Inventor.
Raymond C. Schneider.
By John W. Darley
Attorney.

Aug. 25, 1964 R. C. SCHNEIDER 3,145,535
HYDRAULIC COUPLING
Filed April 11, 1961 3 Sheets-Sheet 2
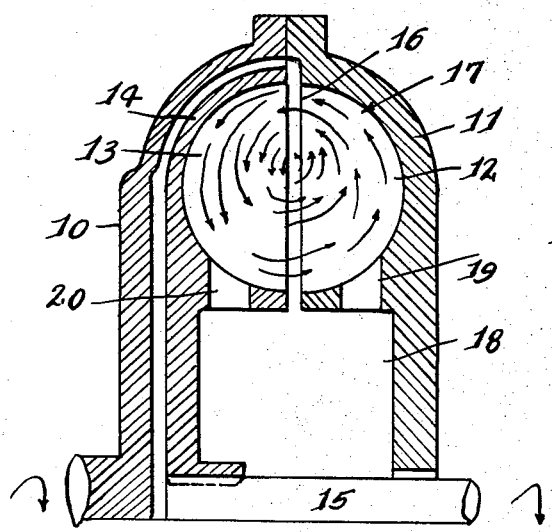
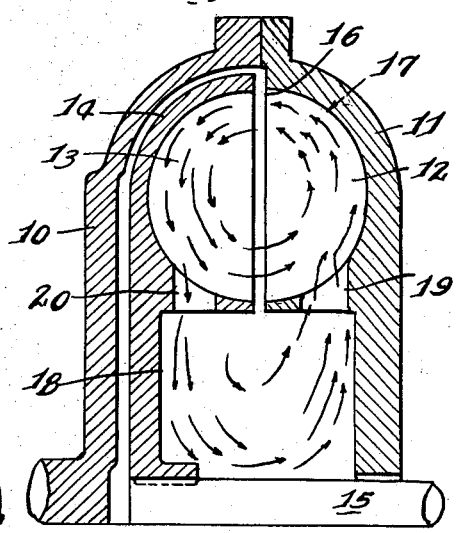
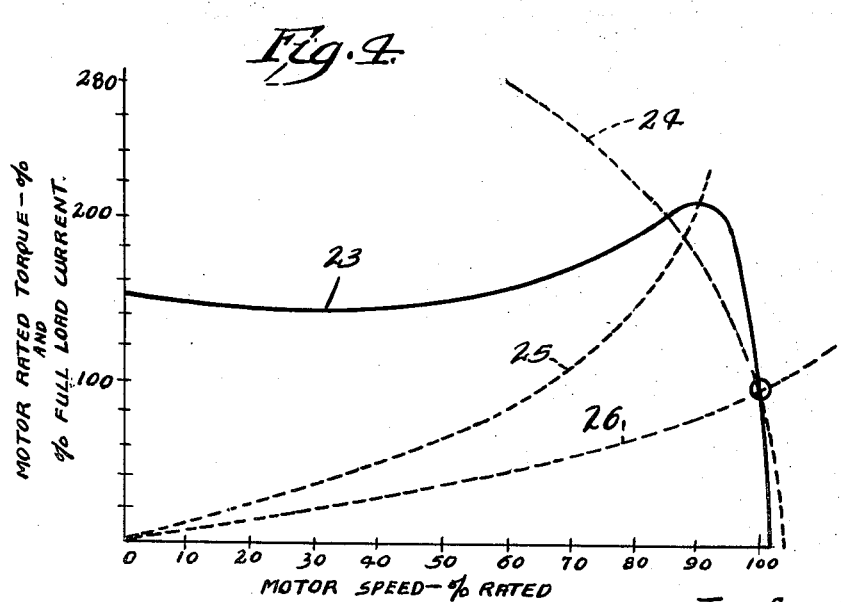
Inventor.
Raymond C. Schneider.
By John O. Dailey
Attorney.

Aug. 25, 1964 R. C. SCHNEIDER 3,145,535
HYDRAULIC COUPLING
Filed April 11, 1961 3 Sheets-Sheet 3
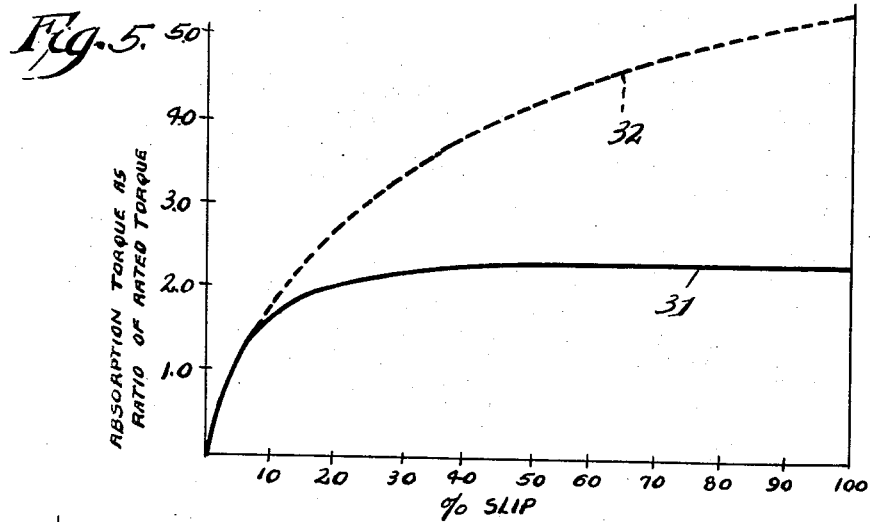
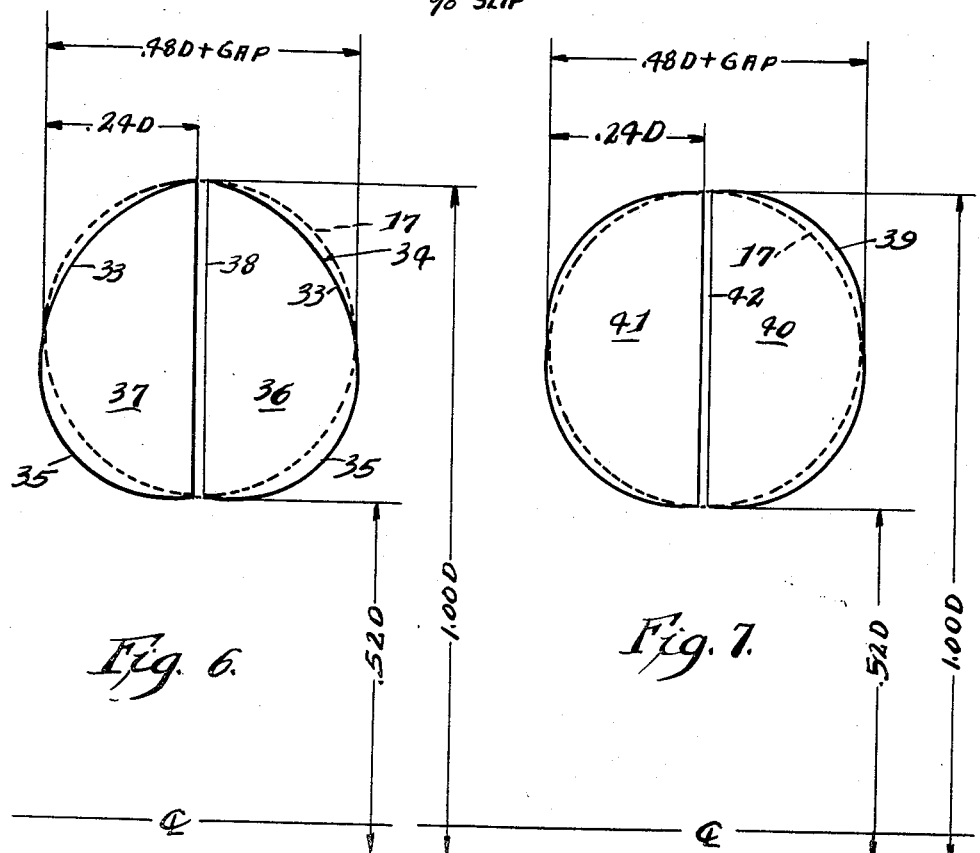
Inventor,
Raymond C. Schneider,
By John W. Darley
Attorney.

United States Patent Office 3,145,535
Patented Aug. 25, 1964

3,145,535
HYDRAULIC COUPLING
Raymond C. Schneider, Rockford, Ill., assignor to Twin Disc Clutch Company, Racine, Wis., a corporation of Wisconsin
Filed Apr. 11, 1961, Ser. No. 102,279
2 Claims. (Cl. 60—54)

My invention relates to hydraulic couplings and more particularly to an arrangement thereof that provides for highly effective use with electric motors of the induction type.

Presently available electric motors of this type develop peak torque at about 90% of rated motor speed. Accordingly, when used as a power input to an hydraulic coupling, it is desirable that the coupling be characterized by a low drag torque ratio at stall and under very high slip conditions so as to insure that the motor speed will not decrease below the above noted 90% speed point.

It is therefore the principal object of the invention to provide an hydraulic coupling having the above characteristics and which will further provide maximum output torque at minimum possible current consumption when connected to an induction type electric motor as a power input.

A further object is to provide an hydraulic coupling in which the desired low drag torque ratio at stall is achieved by critical sizings in a design which will provide maximum output torque at rated slip, will not increase the axial length of the coupling beyond that required for normal operation and in which the torus is free of any valves or other structure ordinarily required to lower the drag torque ratio at stall.

In the drawings:

FIG. 1 is a fragmentary, sectional elevation of the improved hydraulic coupling.

FIGS. 2 and 3 are sectional, schematic elevations, similar to FIG. 1 but in reduced scale, showing, respectively, the liquid circulation at rated slip and at stall.

FIGS. 4 and 5 are characteristic performance curves of the coupling.

FIGS. 6 and 7 are schematic views showing two suggested variations in the shape of the torus which still fall within the criteria with respect to the outer and inner diameters and axial length of the torus.

Referring to FIG. 1, the numeral 10 designates a housing that is driven by an induction type electric motor (not shown) and connected to an impeller 11 having radial, semi-circular blades 12. Cooperably related to the latter blades are radial, semi-circular, turbine blades 13 carried by a turbine 14 that is positioned within and spaced from the housing 10 and is keyed to an output or load shaft 15. The facing and diametral edges of the blades 12 and 13 are separated by an annular gap 16 having a predetermined width as hereinafter set forth.

The annular, liquid working space between the bladed portions of the impeller 11 and turbine 14 plus the gap 16 is designated generally as the torus 17 which is radially spaced from the shaft 15. Between the torus 17, the shaft 15 and the immediate portions of the impeller 11 and turbine 14 is an annular chamber 18 which communicates with the torus portions of the impeller 11 and turbine 14 by means of annular slots 19 and 20, respectively. The slot 19 is included between a ring 21 fast to the curved edges of the impeller blades 12 adjacent the radially innermost gap edges thereof and the adjacent portion of the impeller 11, while the slot 20 is included between a ring 22 fast to the curved edges of the turbine blades 13 adjacent the radially innermost gap edges thereof and the adjacent portion of the turbine 14.

The foregoing sets forth generally the structural components of the coupling without regard to certain criteria found necessary to make the coupling most efficient when driven by an electric motor of the induction type.

To make clear the considerations upon which the sizing criteria presently set forth are based, reference will be had to the performance curves shown in FIG. 4. Presently available induction type, electric motors are designed to achieve peak motor torque at about 90% of rated motor speed as indicated by the curve 23 in FIG. 4. It was determined to be essential that under no conditions should the motor speed decrease below the 90% point and that to obtain maximum coupling output torque with minimum possible current consumption (curve 24 in FIG. 4), the coupling circuit should be designed for a low drag torque ratio at stall or near stall. To achieve these results, it was determined that the coupling characteristics should be so designed that the absorption curve of the coupling when stalled, curve 25 in FIG. 4, should intersect the motor output torque curve 23 at its peak, and yet such characteristics should be such as to transmit rated motor torque with an efficiency of from 97% to 95%. Further consideration also indicated that the working circuit should be such as to provide as high a torque capacity as possible at the normal 3 to 5% slip and not more than 2 to 2.5 times this capacity at full stall.

Additional considerations were the desirability of developing a coupling design incorporating the above characteristics in a unit which did not require an increase in its axial length beyond that necessary to provide maximum output torque at rated slip and in which no baffles, valves or other flow hindering devices were required to establish the desired low drag torque ratio. The objection to the last named elements is that their inclusion in the working circuit or torus decreases the torque capacity of the coupling at rated slip.

It has been determined that in order to accomplish the results outlined above, certain basic criteria must be met with respect to shapes and sizing. In the improved coupling, best results have been obtained with the design shown in FIG. 1 wherein the blades 12 and 13 have semi-circular shapes and are radially positioned and with the annular gap 16 between the opposing diametral edges of the blades. Further, the blades 12 and 13 are flat except for such minor draft, not over 1°, which may be necessary to facilitate casting. However, the indicated relationship alone is not sufficient for the specific purpose intended. The indicated parts must have certain dimensional relationships imposed thereon to provide the circuit required as will now be set forth.

A characteristic of the design is that the working circuit, including the blades 12 and 13 and the gap 16, are dimensioned in terms expressing a ratio of the outer diameter of the torus 17. Referring to FIG. 1, the outer diameter of the torus 17 is denoted as "D" which is measured in inches, and the inner diameter of the torus 17 is .52D. Therefore, the maximum measurement of the torus 17, diametrally of the coupling, is .48D. Axially of the coupling, the maximum width of the torus 17 is the difference between the outer and inner diameters D and .52D, or .48D, plus the width of the gap 16 which is .014D, the radius of each blade 12 and 13 therefore being .24D.

The indicated gap width of .014D is subject to some slight variation within definite limits. This gap width should not be less than .008D nor more than .020D because it has been ascertained that gap widths below and above the indicated limits, respectively, adversely affect the coupling performance and torque absorption.

From FIG. 1, it is apparent that the torus 17 is almost circular and that the portions thereof included in the impeller 11 and turbine 14 are truly semi-circular. This shape of the torus 17 along the inner wall surfaces of the impeller 11 and turbine 14 not only provides the shortest path for the working liquid, but also the least flow disturbance, i.e., change in direction per unit length.

The foregoing dimensional ratios for the working circuit provide maximum output torque at rated slip, but a further important consideration and linked to the sizing of the circuit is the necessity for providing for a low drag torque ratio at full stall of not more than 2 to 2.5 times the torque capacity of the coupling under normal running conditions and when driven by an induction type, electric motor. This consideration is met by partially evacuating the working liquid from the torus 17 into the annular chamber 18 when the coupling is stalled.

Still referring to FIG. 1, the volume of the annular chamber or void 18 is critical and is included between the periphery of the shaft 15, the radial end walls 27 and 28 of the impeller 11 and turbine 14, respectively, and an imaginary cylindrical surface generated by a line 29 which is coincident with the inner surfaces of the rings 21 and 22 and parallel to the axis of the coupling. This chamber volume bears a critical relation to the volume of what is termed the coupling circuit oil for a standard fill. This quantity is defined as that volume of oil which is required to fill the torus 17 minus the blades 12 and 13 and plus the annular gap 16 and the annular space 29 included between the radial wall 28 of the turbine 14 and the housing 10. To facilitate understanding of this coupling circuit oil volume, the coupling in FIG. 1 may be regarded as rotating with 0% slip so that the oil does not circulate around the torus 17, but is only centrifugally forced radially outward of an imaginary cylindrical surface generated by a line 30 which is tangent to the inner portion of the torus 17 and parallel to the axis of the coupling and which surface therefore has a diameter of .52D.

To secure the required drag torque ratio at stall, it has been determined that the volume of the annular chamber 18 should be between 44% and 52% of the volume of the coupling circuit oil, both volumes being as defined. For the annular slots 19 and 20, a suggested axial width for each slot is .0475D measured from a radial wall of the slot which is at a distance of .099D from the gap edge of the associated blades.

Further, for best results, the number of blades in the impeller 11 and turbine 14, respectively, should be between 40 and 48 for any circuit diameter D as long as the indicated considerations with respect to dimensioned ratios and relative volumes are maintained.

When operating under normal running conditions with 3 to 5% slip, the working circulation of the oil occurs entirely within the torus 17 as shown in FIG. 2 and as operably represented by the curve 26 in FIG. 4, while at stall, a part of the oil flows inwardly through the slot 20 into the annular chamber 18 and from which the oil returns to the torus 17 through the slot 19 as shown in FIG. 3 and operably represented by the curve 25 in FIG. 4. It is apparent that the volume of oil in the torus 17 at any instant during stall is reduced to an extent determined by the volume of oil flowing through the annular chamber 18 which is not effective on the turbine as regards its torque output. This condition results in a relatively low drag torque ratio as compared to that obtainable without the chamber 18, and, with the improved coupling, this ratio is not more than 2 to 2.5 times the torque capacity at rated slip.

A graphic and comparative illustration of coupling performance with the annular chamber 18 and slots 19 and 20 and without such provisions are represented by the curves 31 and 32, respectively, in FIG. 5, input speed to the impeller 11 being regarded as constant and the slip indicating coupling torque capacity.

The drag torque ratio at stall or near stall is low enough to insure that the motor speed will not fall below the 90% point referred to above and yet is attained by an arrangement that does not decrease the torque capacity of the coupling at rated slip. Hence, it is possible to transmit higher horsepowers with couplings having a smaller diameter than hitherto considered possible. Other important results flowing from the low torque ratio aspect are that when the stalling or near stalling condition is removed, the motor accelerates instantly and, further, that the coupling is particularly useful for those types of drives where it is desirable to limit the output torque, conveyor machinery being one example. It should be especially noted further with respect to the drag torque feature that the annular chamber 18 is included within the axial length of the coupling per se and hence does not increase such length.

As noted above, the preferred design from the standpoint of cost and performance is shown in FIG. 1 wherein the outer peripheral surfaces of the impeller and turbine torus portions are semi-circular. It is recognized that some variations may be made in the curvature of these surfaces without impairing efficiency of performance. With such variations, the inner and outer diameters and the maximum axial length of the torus 17 are still critical as outlined above and whatever curvature changes are made must satisfy these criteria.

In FIGS. 6 and 7 are schematically shown two such variations in the torus, the numeral 17 in each figure showing in dotted outline and for purpose of comparison the semi-circular torus portions as shown in FIG. 1. In FIG. 6, the torus surface portions indicated by the numerals 33 in the upper quadrants of the torus 34 lie within the quarter circles of the torus 17 in the same locations, while the torus surface portions 35 in the lower quadrants of the torus 34 lie without the quarter circles of the torus 17 in the same locations. The impeller and turbine blades 36 and 37, respectively, are shaped to fit the curved surfaces 33 and 35 and their straight edges are spaced to provide a gap 38 corresponding to the gap 16.

In the FIG. 7 variation, the curved surfaces forming a torus 39 lie outwardly in all quadrants of the quarter circles defining the torus 17 and the impeller and turbine blades 40 and 41, respectively, would be correspondingly shaped and have their straight edges spaced by a gap 42.

While FIGS. 6 and 7 disclose two variations in torus curvature, it will be apparent that in reality there are an infinite number of possible curvatures between the critical points of tangency determined by the inner and outer diameters and the axial width of the torus plus the gap as set forth above. The latter criteria apply regardless of the shape of the curvatures and subject to the further qualification that departures of such variant curvatures from a half circle at any point except the above noted points of tangency shall not exceed .0075D.

I claim:

1. An hydraulic coupling comprising coaxial, rotatable, first and second, annular bladed members arranged in facing and axially spaced relation to provide an annular gap defined by the opposed edges of the blades and including therebetween a torus for the hydraulic transmission of power, the members being identically shaped and each having the same number and shapes of blades to enable either member to serve as the input of the coupling, the torus having outer and inner diameters of D and .52D, respectively, an axial width of .48D plus the gap, and the width of the gap being uniform and being not less than .008D and not more than .020D, the quantity D being expressed in inches, an annular chamber inwardly of the torus and having an axial width not greater than that of the torus, and free passage means in each member connecting the inner part of the associated torus portion with and symmetrically related to the annular chamber whereby the working liquid under a drag torque condition flows to the annular chamber through the passage means of that member which is stalled, the other passage means providing for quick return of the working liquid from the annular chamber to the torus portion of the input member of the coupling when the drag torque condition ceases.

2. An hydraulic coupling as defined in claim 1 wherein the surface of said torus is generally circular and passes through the limiting points determining said outer and inner diameters and said axial width, the torus surface curvature at any point other than said limiting points being at a distance of not more than .0075D from the nearest point on a semicircle passing through said limiting points.

References Cited in the file of this patent

UNITED STATES PATENTS

| | | |
|---|---|---|
| 2,073,357 | Wemp | Mar. 9, 1937 |
| 2,334,282 | Peterson et al. | Nov. 16, 1943 |
| 2,429,503 | Zeidler | Oct. 1, 1947 |
| 2,875,581 | Kugel | Mar. 3, 1959 |

FOREIGN PATENTS

| | | |
|---|---|---|
| 27,824 | Germany | Apr. 19, 1956 |
| 692,286 | Great Britain | June 3, 1953 |

UNITED STATES PATENT OFFICE
CERTIFICATE OF CORRECTION

Patent No. 3,145,535                          August 25, 1964

Raymond C. Schneider

It is hereby certified that error appears in the above numbered patent requiring correction and that the said Letters Patent should read as corrected below.

In the drawings, Sheet 1, Fig. 1, for the dimensions ".24D", each occurrence, read -- .12D --; Sheet 3, Figs. 6 and 7, for ".24D", each occurrence, read -- .12D --; same Figs. 6 and 7, for ".48D + Gap", each occurrence, read -- .24D + Gap --; column 2, lines 59 and 62, and column 4, line 64, for ".48D", each occurrence, read -- .24D --; column 2, line 64, for ".24D" read -- .12D --.

Signed and sealed this 22nd day of June 1965.

(SEAL)
Attest:

ERNEST W. SWIDER                               EDWARD J. BRENNER
Attesting Officer                                   Commissioner of Patents